(12) United States Patent
Chornet et al.

(10) Patent No.: US 8,192,647 B2
(45) Date of Patent: Jun. 5, 2012

(54) PRODUCTION OF SYNTHESIS GAS THROUGH CONTROLLED OXIDATION OF BIOMASS

(75) Inventors: Esteban Chornet, Sherbrooke (CA);
Boris Valsecchi, Sherbrooke (CA);
Sébastien Rheault, Magog (CA);
Martin Gagnon, Sherbrooke (CA)

(73) Assignee: Enerkem Inc., Montreal, Quebec (CA)

( * ) Notice: Subject to any disclaimer, the term of this patent is extended or adjusted under 35 U.S.C. 154(b) by 229 days.

(21) Appl. No.: 12/653,564

(22) Filed: Dec. 16, 2009

(65) Prior Publication Data

US 2010/0224835 A1 Sep. 9, 2010

Related U.S. Application Data

(60) Provisional application No. 61/203,181, filed on Dec. 19, 2008.

(51) Int. Cl.
*C01B 3/38* (2006.01)
*C01B 3/24* (2006.01)
(52) U.S. Cl. ........................................ 252/373; 423/650
(58) Field of Classification Search .................. 252/373
See application file for complete search history.

(56) References Cited

U.S. PATENT DOCUMENTS

| 6,063,355 A * | 5/2000 | Fujimura et al. ............. 423/359 |
| 2005/0109603 A1 | 5/2005 | Graham | |

FOREIGN PATENT DOCUMENTS

| CA | 2210981 | 1/1998 |
| CA | 2424805 | 10/2004 |
| EP | 908672 | 4/1999 |
| EP | 979857 | 2/2000 |
| WO | WO 01/68789 | 9/2001 |
| WO | WO 2009/050494 | 4/2009 |
| WO | WO 2009/132449 | 11/2009 |

* cited by examiner

*Primary Examiner* — Melvin C Mayes
*Assistant Examiner* — Kenneth Vaden
(74) *Attorney, Agent, or Firm* — Carella, Byrne, et al.; Elliot M. Olstein; Raymond J. Lillie

(57) ABSTRACT

A process for producing synthesis gas from biomass in which biomass is contacted with oxygen and steam, wherein the oxygen is present in an amount effective to oxidize the biomass partially and to heat the biomass to a temperature of at least 500° C. and no greater than 750° C. At least a portion of the partially oxidized biomass then is treated with oxygen and steam to heat the biomass to a temperature of at least 800° C., thereby producing a synthesis gas, which then is recovered.

22 Claims, 1 Drawing Sheet

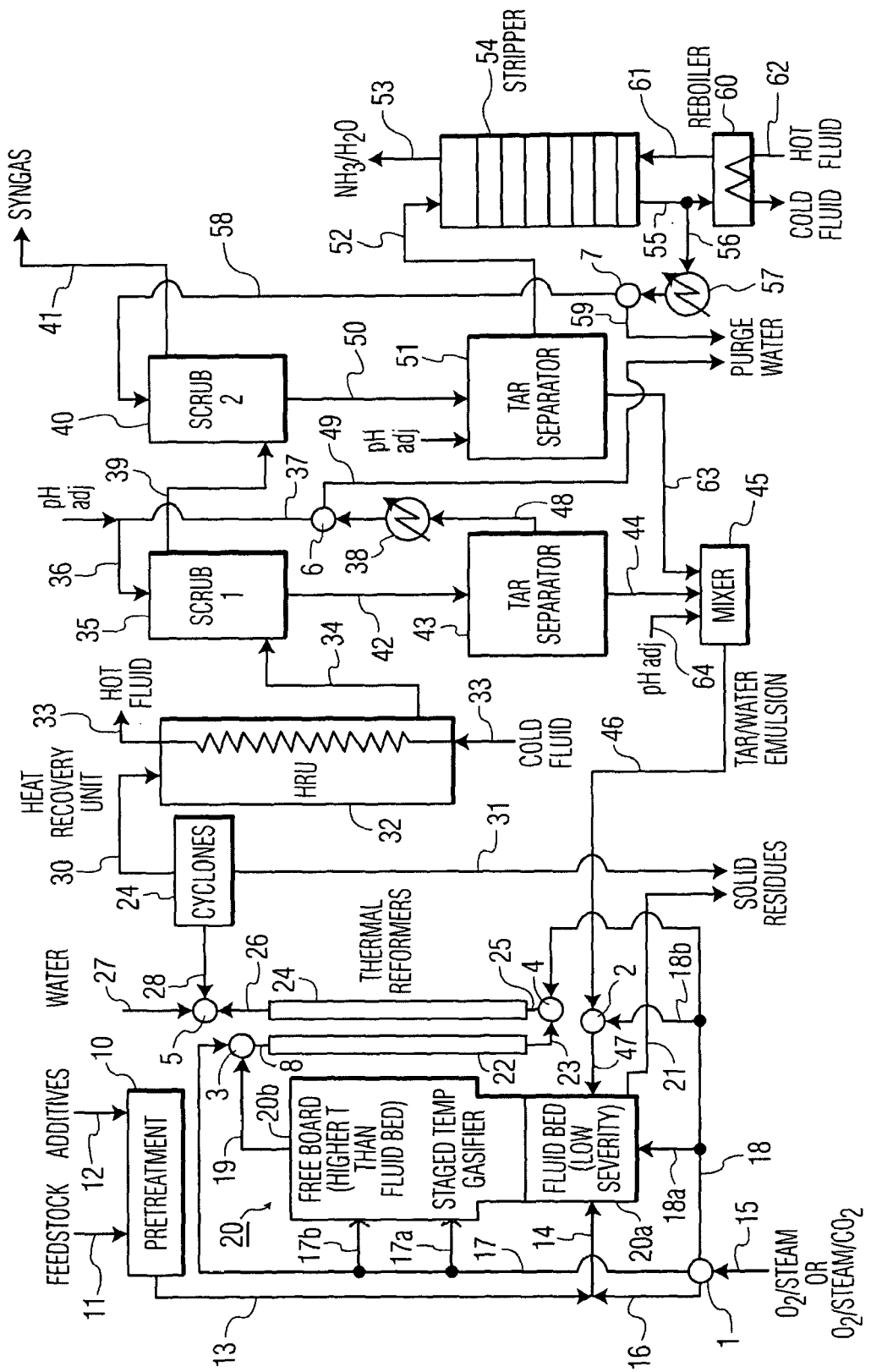

PRODUCTION OF SYNTHESIS GAS THROUGH CONTROLLED OXIDATION OF BIOMASS

This application claims priority based on provisional application Ser. No. 61/203,181, filed Dec. 19, 2008, the contents of which are incorporated herein by reference in their entirety.

This invention relates to the production of synthesis gas, or of syngas, from biomass. More particularly, this invention relates to the production of synthesis gas from biomass by contacting biomass, in a first step, with oxygen and steam, wherein the oxygen is present in an amount effective to oxidize the biomass, thereby producing heat sufficient to heat the biomass to a temperature of at least 500° C. and no greater than 750° C. In a second step, at least a portion of the oxidized biomass produced in the first step is treated with oxygen and steam to heat the biomass to a temperature of at least 800° C., thereby producing synthesis gas.

Synthesis gas, or syngas, includes carbon monoxide (CO) and hydrogen ($H_2$), with small amounts of carbon dioxide and residual hydrocarbons, and has a variety of uses. Synthesis gas may be used as a fuel gas in internal combustion engines, in gas turbines, as well as in gas fired steam boiler plants, or may be used to produce other desired materials, such as methanol and ethanol.

Synthesis gas may be produced by gasifying residual biomass materials, such as forest residues, agricultural residues, spent structural wood materials, and urban biomass, such as municipal solid waste. The gasification of biomass provides a crude synthesis gas which may include impurities such as ammonia ($NH_3$), sulfur compounds (such as hydrogen sulfide ($H_2S$) and carbonyl sulfide (COS)), chlorine compounds (such as HCl), volatile metals, tars, fines (in the form of submicron particles containing metals and metal salts), and char (solid particulates typically above 0.001 mm and containing metals and metal salts). Such impurities, however, limit the ability of the synthesis gas to be used as a fuel or to be employed in the synthesis of other useful materials.

For example, when synthesis gas is used to produce methanol, the synthesis gas is reacted under pressure in the presence of a catalyst. The impurities in a crude synthesis gas produced as a result of gasifying biomass may poison or deactivate the catalyst.

Various methods have been devised for producing crude synthesis gas from biomass, and then cleaning or conditioning the crude synthesis gas. German Patent No. 4317319 discloses the gasification of biomass in the form of granular, shredded raw materials in two high-pressure, fixed-bed gasification units at temperatures up to 1200° C. Oxygen, water vapor, and raw carbon dioxide ($CO_2$) gas also were introduced into the fixed-bed gasification units. The raw synthesis gas produced in the fixed-bed gasification units is scrubbed and cooled with water and then cooled further with the use of indirect heat exchangers. From these steps, various organic components are removed from the gas stream, such as phenol and tars. These can be recycled back to the fixed bed gasifier or fed to the entrained-flow gasifier described below. The gas stream, free of phenol and tars, then is sent to a combined two-stage gas cooling and scrubbing process step, where mixtures of water and methanol are used to reduce the gas temperature to −25° C. and to remove ammonia, hydrogen cyanide, and residual phenolic compounds. Hydrocarbons, some of which may be halogenated, also are removed by the chilled mixture of water and methanol. The hydrocarbon-rich compounds recovered from the chilled water and methanol mixture subsequently can be sent to the entrained-flow gasification unit while the gas stream exiting the low temperature scrubbing unit is dried before it proceeds to a carbonyl sulfide (COS) hydrolysis unit. In that part of the process, the COS in the synthesis gas is reacted with steam to form hydrogen sulfide ($H_2S$) and $CO_2$. The $H_2S$ then is removed from the gas stream in a selective $H_2S$ scrubbing process step. The conditioned synthesis gas is used as fuel in a gas and steam power plant. The $H_2S$-rich stream exiting the selective $H_2S$ scrubbing process is sent to a sulfur recovery process which will produce pure sulfur and a stream of raw $CO_2$. The raw $CO_2$ then is subjected to further purification steps before it is compressed and/or liquefied to manufacture high purity $CO_2$ gas.

Biomass fractions, such as tars and phenols, are used with the fines present in the raw material as feedstock for a high pressure, entrained-flow gasification unit at temperatures reaching 1400° C. Raw synthesis gas from the fixed-bed gasification units also can be introduced and converted in the entrained flow gasifier. The crude synthesis gas stream leaving the entrained flow gasifier is subjected to soot scrubbing. The gas stream then is split into two parallel streams, one of which is fed to a COS hydrolysis unit and the other is fed to a carbon monoxide (CO) conversion unit. The distribution of the synthesis gas stream between those two process units is effected to achieve a desired hydrogen to carbon monoxide ($H_2$/CO) ratio of the gas, which is to be used for a methanol synthesis plant. Both gas streams then are mixed and sent to a cooling stage before the gas is fed to a very-low temperature gas scrubbing process, which uses chilled methanol to reduce to trace levels the $H_2S$ and $CO_2$ concentrations in the synthesis gas. Through solvent regeneration steps, the $H_2S$ and $CO_2$ are removed from the methanol and sent to the same sulfur recovery and/or purification steps as described for the fixed-bed gasification's synthesis gas conditioning process. The scrubbed synthesis gas is fed to a methanol synthesis plant.

German Patent No. 1003150 discloses the gasification of biomass in three gasification units, two of which are of the fixed-bed type and the third is the entrained-flow type. The synthesis gas, which exits the fixed-bed gasification units, is rich in $CO_2$. The $CO_2$-rich synthesis gas is quenched and cooled. The entrained-flow gasification unit's synthesis gas is scrubbed to remove soot before some of the $CO_2$-rich synthesis gas is added to provide the desired $H_2$/CO ratio for the methanol synthesis plant. The recombined synthesis gas is sent to a CO conversion stage and a cooling stage before it is cooled. All the synthesis gas streams then are sent to a very low temperature scrubbing to purify the synthesis gas further, which then is fed to the methanol synthesis plant. The remainder of the gas is sent either to a gas and steam power plant, or burnt in a boiler after it is mixed with raw, synthesis, and/or natural gas.

The processes described in the above-mentioned German patents are conducted under high severity conditions, and incur high capital and operating costs.

United States published patent Application No. 2007/0270511 discloses the gasification of biomass to produce syngas in which a first portion of biomass is gasified in the presence of air to produce syngas. This syngas is combusted to produce a hot flue gas. A second portion of the biomass is gasified in a steam gasifier, at a temperature of from 750° C. to 900° C., to produce syngas. The steam gasifier includes a heat exchanger tubing system, through which is passed the hot flue gas, thereby providing heat to the steam gasifier.

Biomass materials in general are rich in inorganic materials, and such inorganic materials may contain salts that have low melting points, such as, for example, NaCl (801° C.), KCl (776° C.), $CaCl_2$ (772° C.), $MgCl_2$ (714° C.), and $FeCl_2$ (677° C.). Such biomass materials also may include aluminum, which melts at 660° C.

Thus, when biomass is gasified at temperatures such as those described in the above-mentioned German patents and published U.S. patent application, the inorganic materials mentioned hereinabove will melt and induce agglomerations and the formation of deposits in the gasifier. In addition, if the gasification is conducted in the presence of a fluidized bed of particulate material, such melting of inorganic material also will cause agglomeration of the particulate material in the fluidized bed, which leads to eventual loss of fluidization.

The present invention provides an efficient method of producing synthesis gas from biomass.

In accordance with an aspect of the present invention, there is provided a process for producing synthesis gas from biomass. The process comprises, in a first step, contacting the biomass with an oxidizing gas comprising oxygen and steam. The oxygen is present in an amount effective to oxidize the biomass and to heat the biomass to a temperature of at least 500° C. and no greater than 750° C. In a second step, at least a portion of the oxidized biomass produced in the first step is treated with an oxidizing gas comprising oxygen and steam to heat the biomass to a temperature of at least 800° C., to produce synthesis gas. The synthesis gas produced then is recovered.

Biomass-rich materials which may be gasified in accordance with the present invention include, but are not limited to, homogeneous biomass-rich materials, non-homogeneous biomass-rich materials, heterogeneous biomass-rich materials, and urban biomass.

In general, homogeneous biomass-rich materials are biomass-rich materials which come from a single source. Such materials include, but are not limited to, materials from coniferous trees or deciduous trees of a single species, agricultural materials from a plant of a single species, such as hay, corn, or wheat, for example, primary sludge from wood pulp, and wood chips.

Non-homogeneous biomass-rich materials in general are materials which are obtained from plants of more than one species. Such materials include, but are not limited to, forest residues from mixed species, and tree residues from mixed species obtained from debarking operations or sawmill operations.

Heterogeneous biomass-rich materials in general are materials that include biomass and non-biomass materials such as plastics, metals, and/or contaminants such as sulfur, halogens, or non-biomass nitrogen contained in compounds such as inorganic salts or organic compounds. Examples of such heterogeneous biomass-rich materials include, but are not limited to, urban biomass such as municipal solid waste, such as refuse derived fuel, solid recovered fuel, sewage sludge, used electrical transmission poles and railroad ties, which may be treated with creosote, pentachlorophenol, or copper chromium arsenate, and wood from construction and demolition operations which may contain one or more of the above chemicals as well as paints and resins.

In a non-limiting embodiment, prior to the contacting of the biomass with oxidizing gas in the first step, the biomass is admixed with at least one additive material, which neutralizes impurities such as chlorine, fluorine, and sulfur, which may be present in the biomass. In a non-limiting embodiment, the at least one additive is at least one adsorbent material. Such adsorbent materials include, but are not limited to, calcium oxide, or mixtures of calcium oxide, calcined limestone, ash materials, olivine (a silicate of iron and magnesium), and mixtures of calcium and magnesium oxides.

In another non-limiting embodiment, the at least one additive material is added to the biomass in an amount of from about 1.25 to about 3.0 times the stoichiometric quantity required for full neutralization of chlorine and other halogens, as well as sulfur present in the biomass. The term "neutralization," as used herein, includes the formation of stable salts such as $CaCl_2$, $CaF_2$, CaS, and the corresponding salts of magnesium and iron.

In the first step, the biomass is contacted with the oxidizing gas under conditions which effect a partial oxidation of the biomass. As a result of such partial oxidation, the biomass decomposes thermally, and there are produced a solid carbonaceous residue, gases such as $CO_2$, steam, and some carbon monoxide and hydrogen, and vapors of intermediate species such as low molecular weight alkyl and aromatic hydrocarbons, and phenolics such as phenol, catechols, and methoxylated, alkylated, and alkoxylated phenols.

As noted hereinabove, the biomass, in the first step, is heated to a temperature of at least 500° C. and no greater than 750° C. In another non-limiting embodiment, the biomass, in the first step, is heated to a temperature of at least 600° C. and no greater than 750° C. In another non-limiting embodiment, the biomass, in the first step, is heated to a temperature of at least 600° C. and no greater than 725° C. In a further non-limiting embodiment, the biomass, in the first step, is heated to a temperature of at least 600° C. and no greater than 700° C. In yet another non-limiting embodiment, the biomass, in the first step, is heated to a temperature of at least 600° C. and no greater than 660° C.

In a non-limiting embodiment, the oxidizing gas, in the first step, further comprises nitrogen in an amount which does not exceed 60 vol. % of the oxidizing gas. In one non-limiting embodiment, the oxidizing gas includes oxygen-enriched air and steam, in which oxygen is present in an amount of up to about 40 vol. % of the oxidizing gas, and nitrogen is present in an amount that does not exceed 60 vol. % of the oxidizing gas.

In another non-limiting embodiment, the biomass, in the first step, is contacted with oxygen and steam in the absence of nitrogen. In a non-limiting embodiment, oxygen is present in such nitrogen-free gas in an amount which does not exceed 40 vol. %. In yet another non-limiting embodiment, oxygen is present in such nitrogen-free gas in an amount of from about 30 vol. % to about 40 vol. %.

In another non-limiting embodiment, the oxidizing gas, in the first step, further comprises carbon dioxide. In a further non-limiting embodiment, carbon dioxide is present in the oxidizing gas in an amount that does not exceed 20 vol. %. In yet another non-limiting embodiment, carbon dioxide is present in the oxidizing gas in an amount of from about 10 vol. % to about 20 vol. %.

In a further non-limiting embodiment, oxygen is present in the oxidizing gas in an amount of from about 30 vol. % to about 40 vol. %, carbon dioxide is present in the oxidizing gas in an amount of from about 10 vol. % to about 20 vol. %, and the remainder of the oxidizing gas essentially is steam. Trace amounts of argon may be present.

In another non-limiting embodiment, the biomass, in the first step, is contacted with oxygen at a weight ratio of oxygen to biomass that does not exceed 0.35 times the stoichiometric weight ratio needed for complete combustion, i.e., total oxidation of the biomass.

In a further non-limiting embodiment, the biomass, in the first step, is contacted with oxygen at a weight ratio of oxygen to biomass of from about 0.2 to about 0.35 weight of the stoichiometric weight ratio needed for complete combustion of the biomass. In yet another non-limiting embodiment, the biomass is contacted with oxygen at a weight ratio of oxygen to biomass of from about 0.25 to about 0.30 of the stoichiometric weight ratio needed for complete combustion of the biomass.

In another non-limiting embodiment, in the first step, the biomass is contacted with oxygen and steam in a bed of particulate material, whereby the passage of oxygen and steam through such bed provides a fluidized bed of the particulate material. Such particulate materials include, but are not limited to, alumina, olivine, silica, anthracite, desulfurized petroleum coke, and in general, any stable refractory material. In a non-limiting embodiment, the particulate material is selected from the group consisting alumina, olivine and silica. In another non-limiting embodiment, the particles have a diameter of from about 200 microns to about 600 microns.

In another non-limiting embodiment, the biomass is contacted, in the first step, with oxygen and steam for a period of time that does not exceed 10 seconds. In a further non-limiting embodiment, the biomass is contacted, in the first step, with oxygen and steam for a period of time that does not exceed 3 seconds. In yet another non-limiting embodiment, the biomass is contacted, in the first step, with oxygen and steam for a period of time that does not exceed one second.

Although the scope of the present invention is not intended to be limited to any theoretical reasoning, as the biomass is contacted with oxygen and steam in the first step, the biomass is oxidized partially, and is decomposed thermally, thereby producing a solid carbonaceous residue, gases such as $CO_2$, steam, and some carbon monoxide (CO) and hydrogen ($H_2$), and vapors of intermediate species such as low molecular weight alkyl and aromatic hydrocarbons, and phenolics as hereinabove described.

When the biomass is contacted with oxygen and steam, in the first step, in the presence of a fluidized bed, the solid carbonaceous residue produced in the first step remains in the fluidized bed and provides the bulk of the exothermal heat of oxidation, thereby maintaining the fluidized bed at the temperatures hereinabove described. The oxygen used in the first step essentially is consumed in such step, while a portion of the carbonaceous residue formed during the first step is consumed as well, and another portion of the carbonaceous residue is entrained as char. The char particles also may contain inorganic materials initially present in the biomass feedstock.

Some cracking of intermediates, i.e., low molecular weight hydrocarbons, phenolics, and aromatics, may occur during the first step; however, higher temperatures are required to convert the residual carbon in the entrained char particles, and additionally to crack and reform the intermediate vapors containing the low molecular weight alkyl and aromatic hydrocarbons, and phenolics. Thus, in the second step, at least a portion of the partially oxidized biomass produced in the first step is treated with an oxidizing gas comprising oxygen and steam to heat the biomass to a temperature of at least 800° C. to produce synthesis gas.

In a non-limiting embodiment, the partially oxidized and thermally decomposed biomass, in the second step, is heated to a temperature of from about 800° C. to about 1,000° C. In yet another non-limiting embodiment, the oxidized biomass, in the second step, is heated to a temperature of from about 925° C. to about 1,000° C.

In a non-limiting embodiment, the oxidizing gas, in the second step, further comprises nitrogen in an amount which does not exceed 60 vol. % of the oxidizing gas. In one non-limiting embodiment, the oxidizing gas includes oxygen-enriched air and steam, in which oxygen is present in an amount of up to about 40 vol. % of the oxidizing gas, and nitrogen is present in an amount that does not exceed 60 vol. % of the oxidizing gas.

In another non-limiting embodiment, the partially oxidized biomass, in the second step, is contacted with oxygen and steam in the absence of nitrogen. In a non-limiting embodiment, oxygen is present in such nitrogen-free gas in an amount which does not exceed 40 vol. %. In yet another non-limiting embodiment, oxygen is present in such nitrogen-free gas in an amount of from about 30 vol. % to about 40 vol. %.

In another non-limiting embodiment, the oxidizing gas, in the second step, further comprises carbon dioxide. In a further non-limiting embodiment, carbon dioxide is present in the oxidizing gas in an amount that does not exceed 20 vol. %. In yet another non-limiting embodiment, carbon dioxide is present in the oxidizing gas in an amount of from about 10 vol. % to about 20 vol. %.

In a further non-limiting embodiment, oxygen is present in such oxidizing gas in an amount of from about 30 vol. % to about 40 vol. %, carbon dioxide is present in the oxidizing gas in an amount of from about 10 vol. % to about 20 vol. %, and the remainder of the oxidizing gas essentially is steam. Trace amounts of argon may be present.

In a non-limiting embodiment, the oxidized biomass, in the second step, is treated with the oxygen and steam for a period of time of from about 0.5 seconds to about 10 seconds. In another non-limiting embodiment, the oxidized biomass, in the second step, is treated with the oxygen and steam for a period of time of from about 4 seconds to about 8 seconds.

Alternatively, in a further non-limiting embodiment, the oxidized biomass, in the second step, is treated with oxygen and steam in a first stage to a temperature of at least 800° C., followed by further treatment with oxygen and steam in a second stage. The oxidized biomass is heated to a temperature in the second stage which is higher than that of the first stage. In a non-limiting embodiment, the oxidized biomass is heated in the first stage to a temperature of at least 800° C. and does not exceed 850° C.

In another non-limiting embodiment, the oxidized biomass is heated in the second stage to a temperature of at least 900° C. In a further non-limiting embodiment, the oxidized biomass is heated in the second stage to a temperature of from about 900° C. to about 1,000° C. In yet another non-limiting embodiment, the oxidized biomass is heated in the second stage to a temperature of from about 925° C. to about 975° C.

In yet another non-limiting embodiment, the oxidized biomass is heated in the first stage to a temperature of from 800° C. to 850° C., and is heated in the second stage to a temperature of from 925° C. to 975° C.

When the oxidized biomass is contacted with oxygen and steam in the second step, whereby the oxidized biomass is heated to a temperature of at least 800° C., carbon in the char is converted fully by the steam to generate hydrogen and carbon monoxide, and steam reforming of the intermediates yields more hydrogen and carbon monoxide. In general, the inorganic materials which are present in the char in general are exposed to temperatures higher than their melting points. Such inorganic materials will melt and stay melted in the char particles. Deposition of char particles and/or inorganic materials on the walls of the gasification vessel is minimal because the particles are entrained under plug flow conditions.

In a non-limiting embodiment, the biomass is gasified to produce syngas in a gasification vessel or gasifier which has a fluidized bed section and a freeboard section. The biomass is fed to the fluidized bed section of the gasifier by means known to those skilled in the art, such as, for example, through pressure tight star valves (as used in the pulp and paper sector to feed digesters) and a lock hopper system equipped with interlocking valves, and coupled to a belt conveyor which feeds a transfer screw, which ejects the biomass into the fluidized bed section of the gasifier. Alternatively, the biomass may be fed into the fluidized bed section of the gasifier by means of a compression screw working against a plug to create a pressure seal against the gasifier.

In general, the gasifier is operated at a pressure that does not exceed 10 atm. The fluidized bed section includes particles of a fluidizable material, such as alumina or olivine, having a particle size of from about 200 microns to about 600 microns. Oxygen and steam are introduced into the fluidized bed section of the gasifier to provide a gas velocity of from about 0.7 m/sec. to about 1.5 m/sec., thereby providing a bubbling fluidized bed of the particulate material. The oxygen is introduced into the fluidized bed section at a weight ratio of oxygen to biomass of from about 0.20 to about 0.35 of the stoichiometric weight ratio required for complete combustion of the biomass, and thereby maintaining the fluidized bed section of the gasifier at a temperature of from about 600° C. to about 700° C.

As the biomass is introduced into the fluidized bed section, the biomass is oxidized partially as it decomposes thermally to produce a solid carbonaceous residue that stays in the fluidized bed, gases, such as $CO_2$ and some CO and $H_2$, steam from moisture in the biomass as well as from dehydration reactions, and vapors of intermediate species such as low molecular weight alkyl and aromatic hydrocarbons, and phenolics as hereinabove described. The gases and vapors leave the fluidized bed rapidly. In general, the biomass is treated with the oxygen and steam in the first step, for a period of time not exceeding 3 seconds.

The solid carbonaceous material that remains in the fluidized bed reacts with the oxygen that is fed to the fluidized bed section, thereby providing the exothermal heat of oxidation as well as providing CO and $CO_2$ because the oxidation of the biomass in the fluidized bed section is substoichiometric. The oxygen essentially is consumed in the fluidized bed section, whose carbon loading is constant over time, i.e., carbon is produced by thermal decomposition of the biomass, then is consumed by the oxidation, and then the small particles become entrained as char when the size of the particles shrinks to a size which results in their entrainment (typically less than 200 microns). The char particles contain inorganic materials such as salts, for example, which initially are present in the biomass.

The gas and vapors produced as a result of the partial oxidation of the biomass move from the fluidized bed section of the gasifier through a disengaging zone (i.e., a zone separating the fluidized bed section from the freeboard section) prior to entering the freeboard section.

Although some cracking of the intermediate species hereinabove described takes place in the fluidized bed section of the gasifier, in general higher temperatures are required to effect conversion of the residual carbon in the entrained char particles and additionally to crack and steam reform the vapors of the intermediate species. Such intermediate species include low molecular weight hydrocarbons, such as methane, ethylene, ethane, monomeric and dimeric aromatic hydrocarbons, phenol, functionalized phenols, i.e., catechols, methoxylated phenol, alkylated phenol and alkoxylated phenol, and higher molecular weight hydrocarbons known as "tar," i.e., a complex mixture of functionalized polyaromatics and polyphenolic compounds.

The gas and vapors produced in the fluidized bed section pass through the disengaging zone into the freeboard section, in which the gas and vapors are contacted with oxygen and steam to reach a temperature of from about 925° C. to about 1,000° C. The oxygen and steam are introduced into the freeboard section of the gasifier in such an amount that the velocity of the gaseous phase is maintained from about 0.3 m/sec. to about 0.7 m/sec. In general, gas residence times in the freeboard section of the gasifier are from about 4 seconds to about 8 seconds.

In the freeboard section, the phenolics are converted into simple aromatics, and tar cracking and tar reforming are effected. Carbon in the char essentially is converted fully by the steam and $CO_2$ to generate $H_2$ and CO, and steam reforming of the vapors of the intermediate hydrocarbons also generates $H_2$ and CO. Inorganic materials present in the char will melt. Deposition of inorganic materials on the walls of the gasifier, however, is minimal due to particle entrainment in the existing plug flow regime.

As noted hereinabove, in one alternative embodiment, the heating of the partially oxidized biomass to produce synthesis gas may be effected in a combination of a first stage, and a second stage, wherein the partially oxidized biomass is heated to a temperature in the second stage which is greater than that of the first stage.

In one non-limiting embodiment, the first stage is conducted in the freeboard section of the gasifier, and the second stage is conducted in one or more tubular flow reactors. In a non-limiting embodiment, the one or more tubular flow reactor(s) is (are) in the form of refractorized and insulated carbon steel pipes. In another non-limiting embodiment, the heating in the second stage is conducted in two tubular flow reactors which are connected to each other so as to form a U-shaped configuration.

In a non-limiting embodiment, the oxidized biomass is contacted with oxygen and steam in the freeboard section of the gasifier at a temperature of from about 800° C. to about 850° C. The oxygen and steam are introduced into the freeboard section of the gasifier in such amounts that maintain a gaseous velocity of from about 0.3 m/sec. to about 0.7 m/sec., and the reaction time is from about 4 seconds to about 8 seconds, as hereinabove described, to begin the conversion of the oxidized biomass to a crude synthesis gas. The gas produced in the freeboard section also has char particles entrained therein.

The gas and entrained particles then are passed from the freeboard section of the gasifier to one or more tubular flow reactors. In a non-limiting embodiment, additional oxygen and steam are added to the tubular flow reactor(s). In the tubular flow reactor(s), the gas is heated to a temperature of from about 925° C. to about 975° C., and in general, the reaction time in the tubular flow reactor(s) is from about 1 second to about 2 seconds, which is sufficient to complete the conversion of the oxidized biomass to a crude synthesis gas.

A crude synthesis gas product thus is produced by gasifying biomass in the fluidized bed and freeboard sections of the gasifier, and optionally in one or more tubular flow reactors, under the conditions hereinabove described. Such crude synthesis gas then may be conditioned to provide a clean synthesis gas product which may be used as a fuel or may be used to synthesize other compounds such as alcohols (eg., methanol or ethanol) or hydrocarbons.

For example, the crude synthesis gas may be cooled, using water, to a temperature lower than 750° C. The crude synthesis gas then is passed to one or more cyclones to remove any remaining particles having a size over 10 microns. The gas which leaves the cyclone(s) is passed to a heat recovery unit in which the gas travels in a tube contained in the unit. Thermal oil or water surrounding the tube recovers heat from the gas.

The crude synthesis gas then is scrubbed in a scrubbing system having two scrubbers. The first scrubber is a Venturi scrubber that captures at least 95% of the fines and solubilizes traces of HCl and $H_2S$ via alkaline water scrubbing. In the second scrubber, any ammonia which may be left in the gas is scrubbed at neutral pH, and after a stripping operation is returned to the gasifier for additional conversion to $N_2$ and $H_2$.

The process of the present invention enables one to obtain a purified synthesis gas, which can be processed and/or reacted efficiently to provide useful products, such as methanol and ethanol, for example. More particularly, in accordance with another aspect of the present invention, there is provided a purified synthesis gas in which contaminants are present in amounts which do not exceed the following levels as given below:

| | |
|---|---|
| Particulates greater than submicron in size | no greater than 1 mg/$Nm^3$ |
| Metals in particulates | |
| Hg and Cd | no greater than 0.1 mg/$Nm^3$ |
| Pb | no greater than 0.1 mg/$Nm^3$ |
| As | no greater than 0.05 mg/$Nm^3$ |
| Alkali metals | no greater than 0.5 mg/$Nm^3$ |
| Al | no greater than 0.5 mg/$Nm^3$ |
| Si | no greater than 0.5 mg/$Nm^3$ |
| heavy metals | no greater than 0.01 mg/$Nm^3$ |
| Metal vapors in gas | |
| Hg | no greater than 0.001 mg/$Nm^3$ |
| As (as oxides) | no greater than 0.010 mg/$Nm^3$ |
| Cl (as HCl) | not measurable |
| S (as $H_2S$ or COS) | not measurable |
| Tar | no greater than 0.1 mg/$Nm^3$ |

The term "mg/$Nm^3$", as used herein, means the amount of contaminant in milligrams per cubic meter, under normal conditions, i.e., 0° C. and 1 bar as absolute pressure.

BRIEF DESCRIPTION OF THE DRAWING

The invention now will be described with respect to the drawing, wherein:

The drawing is a schematic of the process for producing a synthesis gas in accordance with the present invention.

Referring now to the drawing, a biomass is fed to pretreatment zone 10 through line 11. Additives are fed to pretreatment zone 10 through line 12. The additives which are fed to pretreatment zone 10 include calcium oxide, mixtures of calcium oxide and magnesium oxide, calcined limestone, olivine, and/or mixtures of calcium and magnesium oxides, to neutralize impurities such as chlorine, fluorine, and sulfur, which may be present in the biomass. The additives also may include ash materials, which contain metals that, once reduced in gasifier 20, may have a beneficial catalytic effect during reforming in the freeboard section 20*b*. In general, such additives are present in an amount of from about 0.5 wt. % to about 3.0 wt. %, based on the weight of the biomass.

The biomass and additives are withdrawn from pretreatment zone 10 through line 13 and fed into the fluid bed section 20*a* of gasifier 20 through a feeding system (not shown) including either a series of star valves or a lock hopper system with interlocking valves coupled to a weighted belt conveyor, which feeds a transfer screw to inject the biomass and additives. The feeding system is illustrated schematically as line 14.

A fluidizing gas, such as oxygen and steam, or a mixture of oxygen, steam, and carbon dioxide, is passed from line 15, through compressor 1, to lines 16 and 18, and fed, via a distributed nozzle system (not shown), into the fluid bed section 20*a* of the gasifier 20 through lines 14 and 18*a*.

The fluid bed section 20*a* of gasifier 20 includes a fluidized bed of an appropriate particulate material, such as alumina, olivine, anthracite, desulfurized petroleum coke, or other refractory materials. In general, the fluidized bed material has a particle size of from about 200 microns to about 600 microns.

The fluid bed section 20*a* of the gasifier 20 is operated under conditions which effect partial oxidation and thermal decomposition of the biomass. In general, the temperature of the fluidized bed section 20*a* of the gasifier 20 is maintained at from about 600° C. to about 700° C., and the fluidization gas is fed to the fluidized bed section 20*a* to provide a fluidization velocity of from about 0.7 m/sec. to about 1.5 m/sec. Such fluidization velocity is maintained by the fluidization gas which is fed to the fluid bed section 20*a* of the gasifier 20, as well as by gases formed by the conversion of biomass material in the fluid bed section 20*a*. In general, the fluid bed section 20*a* is operated at a pressure that does not exceed 10 atm.

Oxygen is present in the fluidizing gas in an amount effective to oxidize the biomass and to heat the biomass to a temperature of at least 600° C. and no greater than 700° C. In general, the fluidization gas is fed to the fluid bed section 20*a* such that the weight ratio of oxygen to biomass is from about 0.20 to about 0.35 of the stoichiometric weight ratio required for complete combustion of the biomass.

When the biomass enters the fluid bed section 20*a*, the biomass is oxidized partially as it decomposes thermally, thereby producing a solid carbonaceous residue that remains in the fluid bed section 20*a*, true gases (such as $CO_2$, steam, including that introduced into fluid bed section 20*a* and from dehydration reactions, and some carbon monoxide and hydrogen), and vapors of intermediate species, such as low molecular weight alkyl and aromatic hydrocarbons, phenolics, and condensed and functionalized aromatics, which pass from the fluid bed section 20*a* with the true gases and the fluidizing gas, to the freeboard section 20*b*.

The biomass is contacted with the fluidizing gas in fluid bed section 20*a* for a period of time which is effective for effecting partial oxidation and thermal decomposition of the biomass. In general, such period of time does not exceed 3 seconds.

The carbonaceous residue that remains in the fluid bed section 20*a* reacts with the incoming oxygen to provide the exothermal heat of oxidation. Carbon monoxide and carbon dioxide are formed because the partial oxidation of the biomass is sub-stoichiometric, and the temperature of the fluid bed section 20*a* is maintained at from about 600° C. to about 700° C. The oxygen which was introduced into the fluid bed section 20*a* essentially is consumed in the fluid bed section 20*a*. Carbon also is produced as a result of the thermal decomposition of the biomass. As the biomass continues to be decomposed and oxidized partially in the fluid bed section 20*a*, the carbon particles which were formed as a result of the thermal decomposition also begin to be consumed as a result of partial oxidation of such particles, whereby the carbon particles shrink and become entrained in the fluidizing gas as char particles. In general, such entrained char particles are less than 200 microns in size. The char particles contain inorganic materials, such as salts (eg., alkali chlorides), initially present in the biomass feedstock, except for larger pieces of inorganic material that accumulates in fluid bed section 20a. Excess solid inorganic material, which does not become entrained in the fluidizing gas, and which may be coated with carbon, is withdrawn from fluid bed section 20a through line 21. A differential pressure sensor (not shown) activates a valving system (not shown) that permits adjustment of the level of fluidized bed material in the fluid bed section 20a to maintain a uniform fluidization of the fluidized bed material.

The gases, such as $CO_2$, CO, and hydrogen, and steam, and the vapors of the intermediate species hereinabove described, which are produced by the partial oxidation and thermal decomposition of the biomass, as well as the remainder of the fluidizing gas, constitute a primary synthesis gas which passes from the fluid bed section 20a into the freeboard section 20b of gasifier 20. Char particles also become entrained in the gases and vapors as they pass from the fluid bed section 20a to the freeboard section 20b.

Some cracking of the intermediate species takes place in the fluid bed section 20a; however, higher temperatures are required to crack and steam reform effectively the vapors of the intermediate species, and to convert the residual carbon in the entrained char particles.

The partially oxidized biomass material, now in the form of the primary synthesis gas material hereinabove described, is contacted with additional oxidizing gas in the freeboard section 20b. The oxidizing gas, which is a mixture of oxygen and steam, or a mixture of oxygen, steam, and carbon dioxide as hereinabove described, is introduced into freeboard section 20b through lines 17a and 17b.

The partially oxidized biomass material is contacted with the oxidizing gas in freeboard section 20b at a temperature and for a period of time which are effective to convert the partially oxidized biomass material to a synthesis gas. In general, the partially oxidized biomass is contacted with the oxidizing gas in freeboard section 20b at a temperature of from about 800° C. to about 850° C., and for a period of time of from about 4 seconds to about 8 seconds. The oxidizing gas is introduced into the enlarged freeboard section 20b from lines 17a and 17b so that a velocity of from about 0.3 m/sec. to about 0.7 m/sec. is maintained.

In the freeboard section 20b, carbon in the char is converted fully by the steam in the oxidizing gas, thereby generating hydrogen and carbon monoxide, while steam reforming of intermediates provide further hydrogen and carbon monoxide. The inorganic materials in the char (such as alkali chlorides, for example) are heated to temperatures which are higher than their melting points. Such materials melt and stay melted in the char particles. Deposition of inorganic or other materials on the walls of the freeboard section 20b is minimal given the existing plug flow regime and the encapsulation of the melted material within the char. Also, the char particles do not return to the fluid bed section 20a of gasifier 20 because the fluid dynamic plug flow makes it impossible.

A crude synthesis gas, formed by reacting the partially oxidized biomass material with the oxidizing gas in freeboard section 20b as hereinabove described, is withdrawn from the freeboard section 20b through line 19, and passed into mixer 3, where the crude synthesis gas is mixed with oxidizing gas, as hereinabove described, from line 17. The crude synthesis gas and oxidizing gas then are passed from mixer 3 through line 8 and into thermal reformer 22. Thermal reformer 22 has a simple tubular flow reactor configuration, and may be in the form of a refractory and insulated carbon steel pipe. In thermal reformer 22, further conversion of any carbon in the char particles, and of intermediate hydrocarbon materials remaining in the crude syngas occurs. In general, this further conversion is conducted by contacting the crude synthesis gas with the oxidizing gas at a temperature of from about 925° C. to about 1,000° C., and for a period of time of from about 1 second to about 3 seconds.

The crude synthesis gas then is withdrawn from thermal reformer 22 through line 23, and passed into mixer 4. Oxidizing gas also is introduced into mixer 4 from line 18. The mixture of crude synthesis gas and oxidizing gas then is passed through line 25 and into thermal reformer 24. In thermal reformer 24, additional conversion of carbon and intermediates occurs. In general, thermal reformer 24 has the same configuration as thermal reformer 22, and is operated under the same conditions as thermal reformer 22.

In thermal reformers 22 and 24, further conversion of carbon and intermediate hydrocarbons remaining in the crude synthesis gas occurs, to provide a synthesis gas which also includes residual methane and only trace amounts of hydrocarbons having two or more carbon atoms.

The synthesis gas then is withdrawn from thermal reformer 24 through line 26, and passed into mixer 5, and cooled in mixer 5 with water from line 27 to a temperature of less than 750° C. The cooled synthesis gas then is passed through line 28 into one or more cyclones, depicted schematically as 29.

In the cyclones 29, any remaining particles having a size greater than 10 microns are separated from the synthesis gas and withdrawn from the cyclones 29 through line 31. Such particles are comprised essentially of inorganic materials coated with carbon.

The synthesis gas is withdrawn from the cyclones 29 through line 30, and passed into heat recovery unit 32, wherein the synthesis gas is subjected to further cooling. Such cooling is effected by passing a cold fluid, such as water or a thermal oil, in line 33 through heat recovery unit 32. The fluid in line 33 exits heat recovery unit 32 as a hot fluid, and the cooled synthesis gas is withdrawn from heat recovery unit 32 through line 34, and passed into Venturi scrubber 35. Venturi scrubber 35 includes a throat portion and a demister (not shown). In Venturi scrubber 35, any tars and at least 95% of particulate fines remaining in the synthesis gas are removed. In addition, the synthesis gas is scrubbed with alkaline water from line 36, which dissolves any traces of HCl or $H_2S$ remaining in the synthesis gas and forming corresponding sodium salts.

The water containing the sodium salts, tar, and particulate fines is withdrawn from the Venturi scrubber 35 through line 42 and passed to tar separator 43. Tar and fines are withdrawn from tar separator 43 through line 44 and passed to mixer 45. Water is withdrawn from tar separator 43 through line 48, and passed through cooler 38 and into line 37 and pump 6. A portion of the water is withdrawn from line 37 and pump 6, and passed into line 49 as purge water. Such purge water may be subjected to further treatment and then sent to line 27 as the water used to cool the crude synthesis gas from line 26 prior to the cyclone treatment. The remaining water in line 37 is subjected to an alkaline pH adjustment, and passed to line 36 for recycle to Venturi scrubber 35.

The synthesis gas is withdrawn from Venturi scrubber 35 through line 39 and passed into scrubber 40. In scrubber 40, the synthesis gas is contacted with water, at a neutral pH, from line 58. In scrubber 40, any remaining ammonia, as well as any tars and fines, in the synthesis gas is removed from the synthesis gas.

The treated synthesis gas is withdrawn from scrubber 40 through line 41. Such treated synthesis gas may be, if desired, be subjected to further conditioning, reforming, and/or carbon dioxide removal, prior to being used as a fuel. Alternatively, the synthesis gas may be used as a feed for the synthesis of other desired materials, such as methanol or ethanol, for example.

The water, ammonia, tars, and fines are withdrawn from scrubber 40 through line 50 and passed into tar separator 51, in which the tars and fines are separated from the water and ammonia. The tars and fines are withdrawn from tar separator 51 through line 63 and passed into mixer 45. A tar and water emulsion is formed in mixer 45 as a result of mixing the tar and fines with water from line 64. The water has a pH which is adjusted to approximate that of the biomass which is fed to the fluid bed section 20a of gasifier 20. The tar and water emulsion is withdrawn from mixer 45 through line 46, and is contacted with a fluidization gas from line 18b. The emulsion and the fluidization gas then are passed through pump 2 and fed into the fluid bed section 20a of gasifier 20 through line 47, whereby the tar and fresh or raw biomass are subjected to partial oxidation under the conditions hereinabove described.

Water and ammonia are withdrawn from tar separator 51 through line 52, and passed into stripper 54, in which the ammonia is stripped from the water. Ammonia is withdrawn from stripper 54 through line 53. The ammonia then may be processed further to remove any remaining water, or may be sent, along with pretreated biomass, to the fluid bed section 20a of gasifier 20.

Water is withdrawn from stripper 54 through line 55. If desired, the water may be passed to reboiler 60 to facilitate the removal of any ammonia which may be remaining in the water. The water and ammonia are heated in reboiler 60 by passing a hot fluid, such as a hot thermal oil, through reboiler 60 in line 62. The fluid heats the water and ammonia, and exits reboiler 60 through line 62 as a cold fluid. The heated water and ammonia are withdrawn from reboiler 60 through line 61 and recycled to stripper 54, wherein the ammonia is stripped from the heated water.

When the stripping of the ammonia from the water is completed, the water is withdrawn from stripper 54 through line 55, passed through line 56, cooled in cooler 57, and passed through pump 7 and into line 58. A portion of the water in line 58 is withdrawn as purge water through line 59. Such purge water may be subjected to further treatment, and then be sent to line 27 to cool the crude synthesis gas in line 26. The remaining water in line 58 is passed to scrubber 40 for scrubbing of ammonia, tars, and fines, from the synthesis gas.

The disclosures of all patents and publications, including published patent applications, are incorporated herein by reference to the same extent as if each patent and publication individually were incorporated by reference.

It is to be understood, however, that the scope of the present invention is not to be limited to the specific embodiments described above. The invention may be practiced other than as particularly described and still be within the scope of the accompanying claims.

What is claimed is:

1. A process for producing synthesis gas from biomass, comprising:
    (a) contacting said biomass with an oxidizing gas comprising oxygen and steam, wherein said oxygen is present in an amount effective to oxidize said biomass and to heat said biomass to a temperature of at least 500° C. and no greater than a maximum of 750° C.;
    (b) treating at least a portion of said oxidized biomass produced in step (a) with an oxidizing gas comprising oxygen and steam in a first stage to heat said oxidized biomass to a temperature which is at least 800° C. and does not exceed a maximum of 850° C.;
    (c) treating at least a portion of said oxidized biomass produced in step (b) with an oxidizing gas comprising oxygen and steam in a second stage to heat said oxidized biomass to a temperature which is at least 900° C. and does not exceed a maximum of 1,000° C., thereby producing synthesis gas; and
    (d) recovering said synthesis gas produced in step (c).

2. The process of claim 1 wherein, in step (a), said biomass is heated to a temperature of from about 600° C. to about 750° C.

3. The process of claim 2 wherein, in step (a), said biomass is heated to a temperature of from about 600° C. to about 725° C.

4. The process of claim 1 wherein, in step (a), said biomass is contacted with said oxygen at a weight ratio of oxygen to biomass of from about 0.20 to about 0.35 of the stoichiometric weight ratio needed for complete combustion of said biomass.

5. The process of claim 4 wherein, in step (a), said biomass is contacted with said oxygen at a weight ratio of oxygen to biomass of from about 0.20 to about 0.30 of the stoichiometric weight ratio needed for complete combustion of said biomass.

6. The process of claim 5 wherein, in step (a), said biomass is contacted with said oxygen at a weight ratio of oxygen to biomass of from about 0.25 to about 0.30 of the stoichiometric weight ratio needed for complete combustion of said biomass.

7. The process of claim 1 wherein, in step (a), said biomass is contacted with said oxygen and said steam in a fluidized bed of particulate material.

8. The process of claim 1 wherein in step (a), said biomass is contacted with oxygen and steam in the absence of nitrogen.

9. The process of claim 1 wherein, in step (c), said oxidized biomass is heated to a temperature of at least 925° C., and which does not exceed 1,000° C.

10. The process of claim 1 wherein, in steps (b) and (c), said oxidized biomass is contacted with oxygen and steam in the absence of nitrogen.

11. The process of claim 1 wherein said oxidizing gas, in step (a), further comprises carbon dioxide.

12. The process of claim 11 wherein said carbon dioxide is present is said oxidizing gas in step (a) in an amount that does not exceed 20 vol. %.

13. The process of claim 12 wherein said carbon dioxide is present in said oxidizing gas in step (a) in an amount of from about 10 vol. % to about 20 vol. %.

14. The process of claim 13 wherein oxygen is present in said oxidizing gas in step (a) in an amount of from about 30 vol. % to about 40 vol. %, carbon dioxide is present in said oxidizing gas in step (a) in an amount of from about 10 vol. % to about 20 vol. %, and the remainder of said oxidizing gas in step (a) essentially is steam.

15. The process of claim 1 wherein said oxidizing gas, in step (b), further comprises carbon dioxide.

16. The process of claim 15 wherein said carbon dioxide is present in said oxidizing gas in step (b) in an amount that does not exceed 20 vol. %.

17. The process of claim 16 wherein said carbon dioxide is present in said oxidizing gas in step (b) in an amount of from about 10 vol. % to about 20 vol. %.

18. The process of claim 17 wherein oxygen is present in said oxidizing gas in step (b) in an amount of from about 30 vol. % to about 40 vol. %, carbon dioxide is present in said oxidizing gas in step (b) in an amount of from about 10 vol. % to about 20 vol. %, and the remainder of said oxidizing gas in step (b) essentially is steam.

19. The process of claim 1 wherein said oxidizing gas, in step (c), further comprises carbon dioxide.

20. The process of claim 19 wherein said carbon dioxide is present in said oxidizing gas in step (c) in an amount that does not exceed 20 vol. %.

21. The process of claim 20 wherein said carbon dioxide is present in said oxidizing gas in step (c) in an amount of from about 10 vol. % to about 20 vol. %.

22. The process of claim 21 wherein oxygen is present in said oxidizing gas in step (c) in an amount of from about 30 vol. % to about 40 vol. %, carbon dioxide is present in said oxidizing gas in step (c) in an amount of from about 10 vol. % to about 20 vol. %, and the remainder of said oxidizing gas in step (c) essentially is steam.

* * * * *